United States Patent Office 2,716,117
Patented Aug. 23, 1955

2,716,117

STABILIZED PURE PHENOTHIAZINE

Reinhard Böker and Richard Brodersen, Frankfurt am Main, Germany, assignors to Farbwerke Hoechst Aktiengesellschaft vormals Meister Lucius und Brüning, Frankfurt am Main Hochst, Germany, a German company No Drawing. Application December 9, 1952,
Serial No. 325,017

Claims priority, application Germany December 20, 1951

3 Claims. (Cl. 260—243)

This invention relates to a process of stabilizing pure phenothiazine for medical purposes by means of hexamethylene tetramine and to the phenothiazine thus stabilized.

It is known that commercial phenothiazine obtained by the method of Bernthsen contains certain quantitites of by-products of predominantly green, reddish or dark color, and that, owing to the toxic effect of these impurities upon the blood-picture, such phenothiazine is absolutely unsuitable for human and veterinary medicine. In order to render it suitable for use as an anthelmintic, thorough purification is, therefore, necessary. However, experience has shown that even in a highly purified state the substances acquire a green or purple color after a short time, when stored with the access of air or moisture. In order to check such discoloration of commercial phenothiazine to a certain extent, agents containing or liberating sulfur dioxide have been added as stabilizers, but they are obviously unsuitable for medicinal purposes.

We have found that phenothiazine can be stabilized in a form well suited for medical purposes by incorporating with it hexamethylene tetramine. For this purpose a small proportion, advantageously about 0.3–3 per cent, may be mixed directly with the phenothiazine, or a solution of hexamethylene tetramine in a suitable solvent may be mixed with the phenothiazine and the solvent subsequently removed. It may also be of advantage to incorporate the stabilizer during the manufacture of the phenothiazine, in order to save a separate operation. In this manner the efficacy of the product is not diminished.

For example, it is customary to expel phenothiazine from the reaction mixture by means of superheated steam under reduced pressure and to chill it with circulated water. For the purposes of the present invention hexamethylene tetramine dissolved, for example, in methanol, may be introduced into the water by means of nozzles and thus incorporated with the finely divided phenothiazine.

The following examples serve to illustrate the invention but they are not intended to limit it thereto:

*Example 1*

4.8 kilograms of pure phenothiazine suitable for medicinal use and having a slight green hue are first mixed in a ball mill for ½ hour with 0.2 kilogram of hexamethylene tetramine, then a further 5 kilograms of phenothiazine are added, and the whole is intimately mixed for 1 hour. The finished product no longer has a green hue and, in contradistinction to the non-stabilized product, does not undergo discoloration when exposed to the air for a long time.

*Example 2*

100 grams of pure phenothiazine suitable for medicinal use are stirred with a hot or cold solution of 1 gram of hexamethylene tetramine in 300 cc. of methanol, filtered with suction to remove the solvent and then dried. The product so obtained is stable in air for a longer time than the non-stabilized product.

*Example 3*

100 grams of pure phenothiazine suitable for medicinal use, and having a particle size from 4 to 15$\mu$ are stirred into 900 cc. of water and mixed with a solution of 1 gram of hexamethylene tetramine in 150 cc. of methanol. A good wetting effect is obtained immediately. After being stirred for one hour, the mixture is filtered off with suction to remove the solvent and then dried under reduced pressure.

The product so obtained is stable towards air and moisture for a longer time than the non-stabilized product.

We claim:

1. Phenothiazine containing hexamethylene tetramine as a stabilizer, wherein the proportion of hexamethylene tetramine incorporated with the pure phenothiazine amounts to about 0.3 to 3.0 per cent.

2. Phenothiazine containing about 1 per cent hexamethylene tetramine as a stabilizer.

3. Phenothiazine containing about 2 per cent hexamethylene tetramine as a stabilizer.

References Cited in the file of this patent

Burger, "Medicinal Chemistry" (1951), vol. II, p. 935.
Kroger et al., "Erdöl u. Kohle" (1948), vol. 1, pp. 389–96.
Fuson, "Org. Chem." (1947), p. 67.